United States Patent
Yang et al.

(10) Patent No.: US 9,472,229 B1
(45) Date of Patent: Oct. 18, 2016

(54) ADAPTIVE LASER OUTPUT CONTROL IN A HAMR DEVICE

(71) Applicant: Seagate Technology LLC, Cupertino, CA (US)

(72) Inventors: Won Choul Yang, Hong Kong (CN); Shi Jung Kim, Gyeonggi-do (KR); Ju Yong Lee, Incheon (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/688,049

(22) Filed: Apr. 16, 2015

(51) Int. Cl.
*G11B 7/1263* (2012.01)
*G11B 7/126* (2012.01)
*G11B 7/1267* (2012.01)
*G11B 5/00* (2006.01)

(52) U.S. Cl.
CPC .............. *G11B 7/126* (2013.01); *G11B 7/1263* (2013.01); *G11B 7/1267* (2013.01); *G11B 2005/0021* (2013.01)

(58) Field of Classification Search
CPC ....... G11B 7/126; G11B 7/00; G11B 7/1267; G11B 7/0037; G11B 11/10595; G11B 23/40; G11B 7/0062; G11B 11/1053; G11B 19/04; G11B 20/10; G11B 20/1816; G11B 20/182; G11B 2220/216; G11B 27/36; G11B 7/0045; G11B 7/00456; G11B 7/00454; G11B 7/0956; G11B 7/1263; G11B 19/00; G11B 19/041; G11B 2007/0013; G11B 7/00375; G11B 7/00458; G11B 7/005; G11B 7/00736; G11B 2005/0005; G11B 2005/0021; G11B 5/3133; G11B 5/314; G11B 5/607; G11B 5/6076; G11B 7/0065; H01S 5/0654; H01S 5/0687; H01S 5/141; G01N 21/9506
See application file for complete search history.

(56) References Cited

U.S. PATENT DOCUMENTS

| | | | |
|---|---|---|---|
| 6,671,232 B1 | 12/2003 | Stupp | |
| 8,406,090 B2 | 3/2013 | Juang et al. | |
| 8,451,696 B2 | 5/2013 | Huang et al. | |
| 8,897,103 B2 | 11/2014 | Alex | |
| 8,908,317 B1* | 12/2014 | Aoyagi | G11B 5/6076 360/31 |
| 2005/0213436 A1* | 9/2005 | Ono | G11B 5/3133 369/13.02 |
| 2009/0201790 A1* | 8/2009 | Lai | G11B 7/126 369/116 |
| 2010/0074089 A1* | 3/2010 | Smith | G11B 7/0065 369/103 |

FOREIGN PATENT DOCUMENTS

EP 0548111 B1 9/1997

OTHER PUBLICATIONS

U.S. Appl. No. 14/278,377, filed May 15, 2014, 25 pages.
U.S. Appl. No. 14/278,386, filed May 15, 2014, 26 pages.
U.S. Appl. No. 14/674,360, filed Mar. 31, 2015, 26 pages.

* cited by examiner

Primary Examiner — Dionne H Pendleton
(74) Attorney, Agent, or Firm — Leanne Taveggia Farrell; Westman, Champlin & Koehler, P.A.

(57) ABSTRACT

A current temperature of a data storage device having a heat assisted recording (HAMR) device is measured while in idle. A threshold laser diode power output of the HAMR device is calculated at the current temperature when there is a change between a previous temperature and the current temperature. A new laser diode current that produced the calculated threshold laser diode power output is applied to the HAMR device when there is a change between the currently applied laser diode current and the new laser diode current.

14 Claims, 8 Drawing Sheets

ADAPTIVE LASER OUTPUT CONTROL IN A HAMR DEVICE

SUMMARY

A method includes measuring a current temperature of a data storage device while in idle. The data storage device includes a heat assisted magnetic recording (HAMR) device. A threshold laser diode power output of the HAMR device is calculated at the current temperature when there is a change between a previous temperature and the current temperature. It is determined whether there is a change between the currently applied laser diode current and a new laser diode current that produced the calculated threshold laser diode power output. The new laser diode current is applied when there is a change in laser current from the currently applied laser diode current to the new laser diode current.

A data storage device comprising includes a medium, a heat assisted magnetic recording (HARM) device including a laser diode for heating the medium while writing data and control circuitry. The control circuitry is configured to measure a current temperature of the data storage device while in idle, calculate a threshold laser diode power output of the HAMR device at the current temperature when there is a change between a previous temperature and the current temperature, determine whether there is a change between the currently applied laser diode current and a new laser diode current that produced the calculated threshold laser diode power output and write the new laser diode current to a preamp when there is a change in laser current from the currently applied laser diode current to the new laser diode current.

A method comprising includes measuring a current temperature of a data storage device while in idle. The data storage device includes a heat assisted magnetic recording (HAMR) device. A threshold laser diode power output of the HAMR device is calculated at the current temperature when there is a change between a previous temperature and the current temperature that is greater than a threshold value. It is determined whether there is a change between the currently applied laser diode current and a new laser diode current that produced the calculated threshold laser power output. The new laser diode current is written to a preamp when there is a change in laser current from the currently applied laser diode current to the new laser diode current.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The drive performance of a Heat Assisted Magnetic Recording (HAMR) device varies with respect to the drive temperature if the applied laser current is not changed as the temperature changes. That performance variation may be based on the effects of temperature on the laser diode of HAMR device. In general, the threshold of laser diode power output increases as data storage device or drive temperature increases. This disclosure describes a method of determining a threshold laser power output in a HAMR device against temperature when the data storage device is in idle and as a background task and compensating for the magnetic performance change caused by the change in threshold laser power output by adjusting the laser current.

Figure 1:
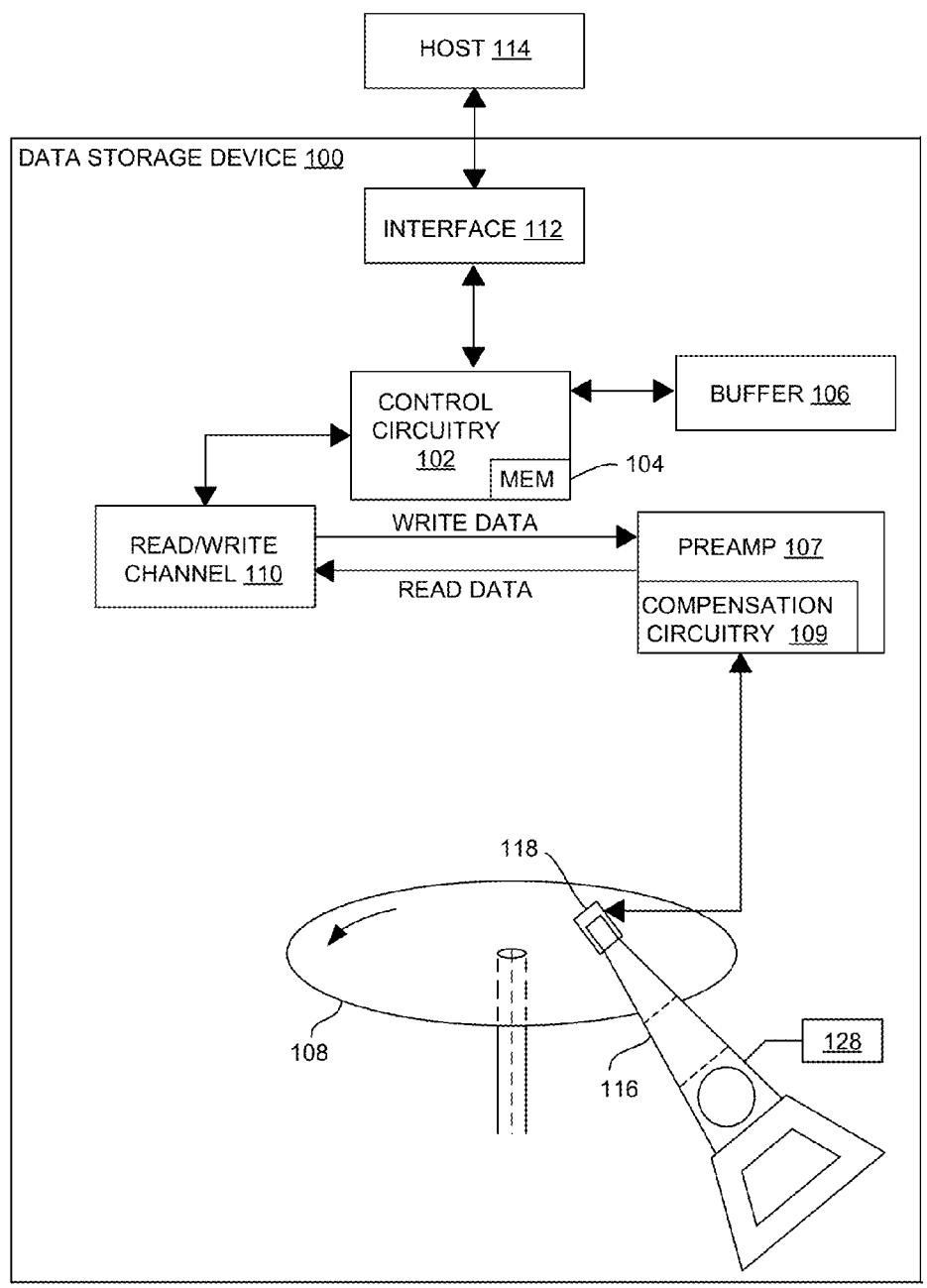
FIG. 1 is a schematic diagram of exemplary components of a data storage device including a head stack assembly and a medium.

FIG. 1 is a simplified block diagram of an exemplary data storage device 100 that can be used in embodiments described herein. Data storage device 100 includes control circuitry 102, which is used for controlling operations of data storage device 100 with the use of programming stored in memory 104. Control circuitry 102 may be coupled to a buffer 106 through a read/write channel 110. Buffer 106 can temporarily store user data during read and write operations and may include the capability of temporarily storing access operations pending execution by control circuitry 102.

Data storage device 100 includes storage medium or magnetic recording medium (i.e., disc) 108 and a suspension 116 supporting a transducer 118 (in this case a HAMR transducer or device) that can read and write data to medium 108. In the embodiment illustrated in FIG. 1, the storage medium 108 is illustrated as being a rotatable disc. Data storage device 100 also includes a preamplifier (preamp) 107 for generating a write signal applied to transducer 118 during a write operation, and for amplifying a read signal emanating from transducer 118 during a read operation. In some embodiments, preamp 107 also includes compensation circuitry 109.

Control circuitry 102 executes read and write operations on data storage medium 108. These read/write operations executed by control circuitry 102 may be performed directly on data storage medium 108 or through read/write channel 110. Read/write channel 110 receives data from control circuitry 102 during a write operation, and provides encoded write data to data storage medium 108 via preamp 107. During a read operation, read/write channel 110 processes a read signal via preamp 107 in order to detect and decode data recorded on data storage medium 108. The decoded data is provided to control circuitry 102 and ultimately through an interface 112 to an external host 114.

External host 114 contains logic (e.g., a processor) capable of issuing commands to data storage device 100. Although FIG. 1 illustrates external host 114 as being a single host, data storage device 100 can be connected through interface 112 to multiple hosts. Via interface 112, data storage device 100 receives data and commands from external host 114 and can provide data to external host 114 based on commands executed by control circuitry 102.

Figure 2:
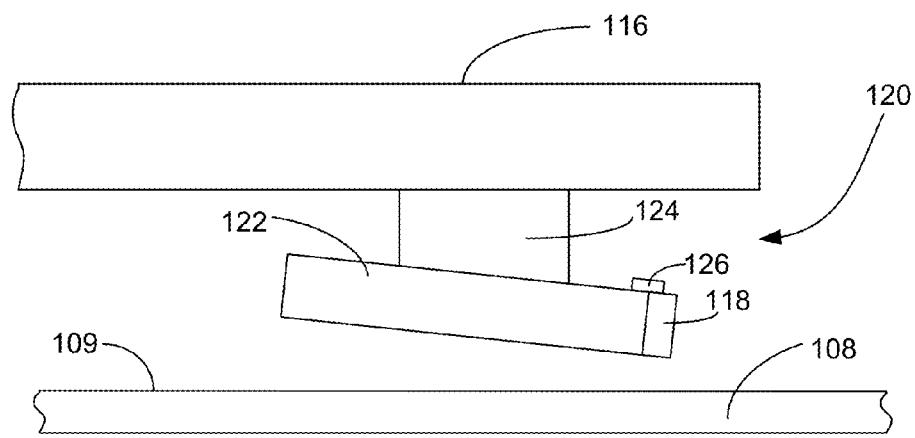
FIG. 2 is a schematic diagram of a side view of a head gimbal assembly (HGA).

FIG. 2 illustrates an enlarged side view of a head gimbal assembly (HGA) 120 illustrating a suspension 116 supporting a slider 122 by a gimbal 124. Slider 122 includes transducer 118, which is rotatable relative to suspension 116 via gimbal 124. Transducer 118 is located at a trailing edge of slider 122 and is held proximate to surface 109 of medium 108 for reading and writing data. Transducer 118 includes a magnetic writer coil (not illustrated), a reader (not illustrated) and an optical near field transducer (NFT) 129, which is described below.

A HAMR transducer, such as a transducer 118, uses an energy source to locally heat a small portion of a recording medium to overcome superparamagnetic effects that limit the areal data density of a magnetic medium, such as medium 108. The heating of the medium raises a region of the medium's temperature above a set temperature, allowing for it to be magnetized by a magnetic writer. The medium quickly cools as it rotates away from the energy source and therefore magnetically freezes the written pattern for stable, long-term storage of data.

Figure 3:
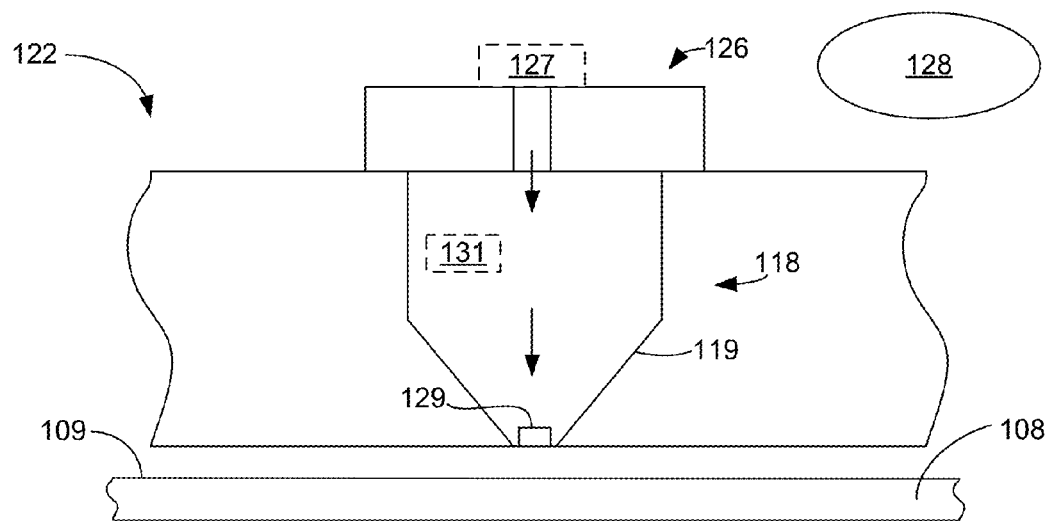
FIG. 3 illustrates an enlarged diagram of a trailing end of a slider of the HGA illustrated in FIG. 2.

FIG. 3 illustrates an enlarged diagram of a trailing end of slider 122. HAMR transducer 118 may include optical components, such as an optical wave guide 119, that direct, concentrate and transform light energy from a laser assembly 126 to heat medium 108. Laser assembly 126 includes a laser diode that receives a current input and applies laser energy onto medium 108 through optical wave guide 119. The HAMR medium hot spot may need to be smaller than the diffraction limit of light. One way to achieve such small hot spots is to use an optical near field transducer (NFT) 129.

Control of the applied laser energy in a HAMR device is essential to performance. If the heat energy imparted to the medium 108 is too low then medium 108 is not sufficiently heated, and the recorded signal is of a poor quality. If the energy is too high, the recorded signal of adjacent tracks may be partially erased. Moreover, the energy can change even if the current of the heat energy is constant. For example, the laser energy for a given laser current varies with temperature and also varies with other effects, such as with laser diode aging or other component aging. For example, as components age, the amount of applied laser current needed to achieve the same degree of media heating may vary.

In one embodiment, laser diode input current may be controlled by a register in preamplifier 107 (FIG. 1). Preamplifier 107 contains a digital-to-analog converter (DAC) to convert the programmed register value into an applied current. The laser energy output from transducer 118 (FIGS. 2 and 3) onto medium 108 can vary. Even if the current to the laser diode is accurate and constant, the power output from the laser diode may not. For example, a forward voltage drop of the laser diode can cause this relationship to vary. In addition, the preamplifier's applied current may not always be accurate and may also vary. Temperature has a strong effect on all of these variations.

There are two parameters that are critical to drive quality—the bit error rate (BER) of the written track on the media and the degradation imparted to adjacent tracks (adjacent track interference or ATI) by the write operation. Changes in laser power impact both of these parameters. Unfortunately, to perform BER and ATI measurements well, many revolutions of writing are required. In addition, experimentally performing these measurements may cause degradation to the data on adjacent tracks. Therefore, performing BER and ATI measurements are not practical to perform on a frequent basis while the drive is in normal operation.

Two parameters that can be sensed regularly without performance degradation include temperature and laser output power. Temperature can be sensed periodically using a thermistor 128, for example. Laser output power can also be sensed in real-time, for example, with a sensor such as a photodiode 127 or, in another embodiment, with a bolometer 131, which is a detector that changes light into temperature. In the embodiment illustrated in FIG. 3, photodiode 127 can be, in one embodiment, part of laser assembly 126, which can be manufactured on each transducer and can be used to measure the laser power or energy within the recording head. The arrow within transducer 118 in FIG. 3 illustrates the path of laser energy through optical wave guide 119 from laser assembly 126 to NFT 129. As shown, laser energy emanates from laser assembly 126 and energy from NFT 129 heats a portion of medium 108. In an alternative embodiment, bolometer 131 can be coupled to optical wave guide 119 and may also measure laser output power in recording head 118.

There are three general modes of operation for the laser diode in a HAMR drive. When idle, the diode is fully off or inactive (no applied current). When writing data, the diode is fully on or active with an applied current sufficient to record or erase data to medium 108. In preparation for writing, the laser diode is partially on or biased with a current insufficient to record or erase data to medium 108.

Figure 4:
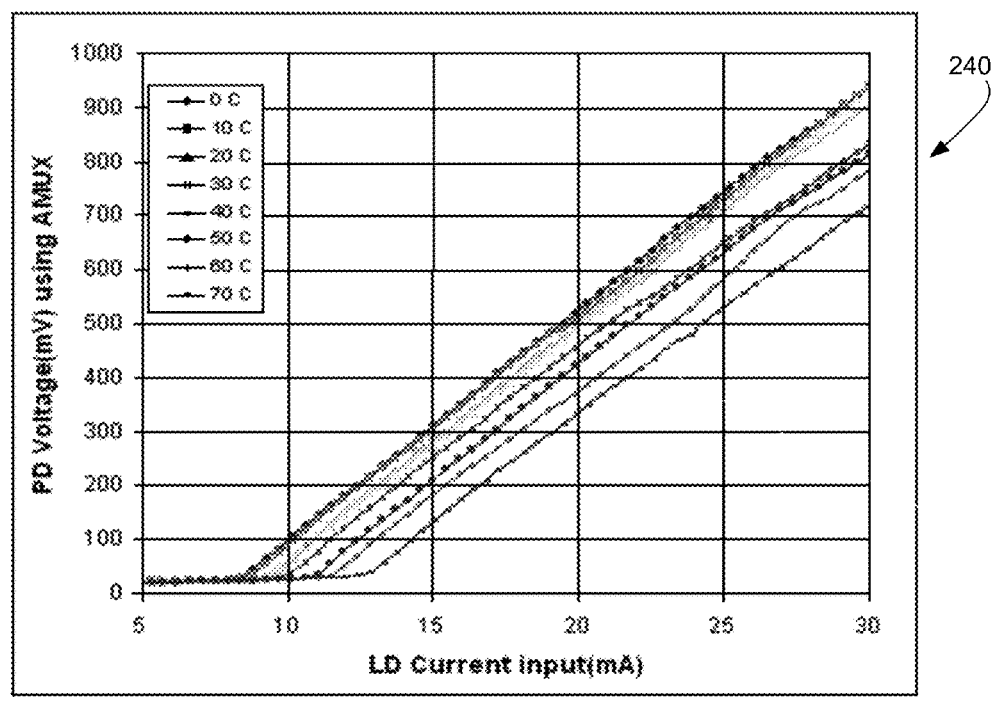
FIG. 4 illustrates a graphical representation illustrating the relationship of applied laser current to sensed laser output power at different temperatures.

FIG. 4 illustrates a graphical representation 240 illustrating the relationship of applied laser current or laser diode (LD) current (on the x-axis) to sensed laser output power (on the y-axis) at different temperatures as measured during the engineering phase. The sensed laser output power is measured by, for example, photodetector 127 or bolometer 131, and is typically measured in terms of sensor voltage or current. Photodetector 127 converts photons to electrons, which in turn lead to a voltage that can be measured by preamp 107. Bolometer 131 measures the power of incident electromagnetic radiation via the heating of the material of optical wave guide 119 with a temperature-dependent electrical resistance. As illustrated by graphical representation 240, the relationship can be, but not limited to, linear, and therefore can be described by equation(s) or tables that model such a relationship. In other embodiments, where the relationship is more complex, curve fitting can be used. As also illustrated in FIG. 4, the threshold laser diode power output changes as a function of temperature. If temperature is increased, threshold laser power output is increased. Therefore, as temperature increases, applied laser diode current should be increased to maintain performance.

Figure 5:
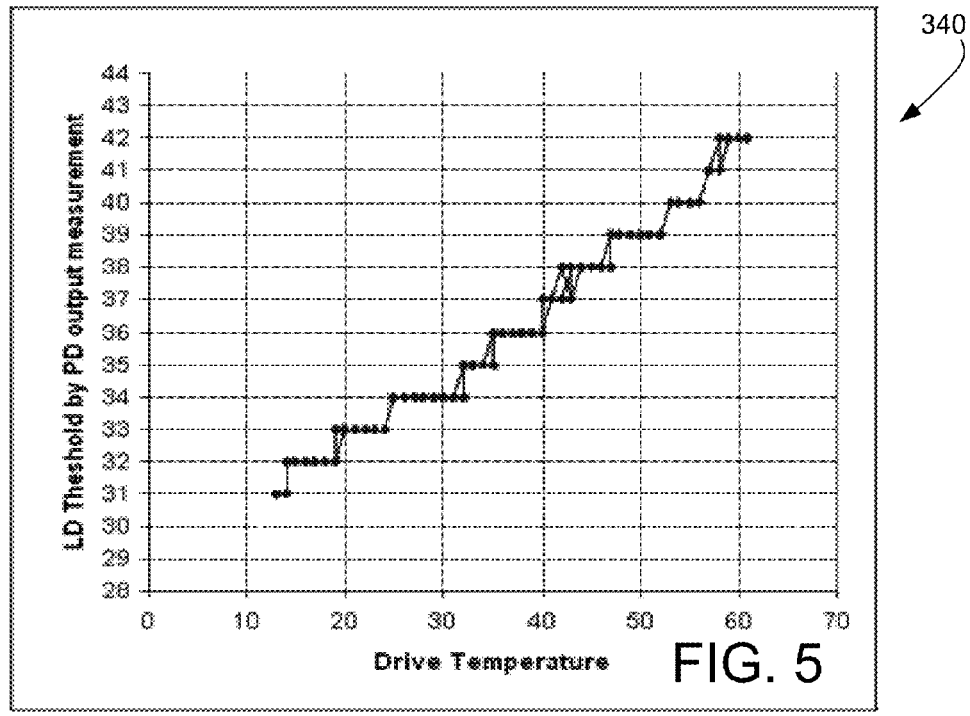
FIGS. 5 and 6 illustrate graphical representations illustrating threshold laser power output relative to temperature using a photo diode.
Figure 6:
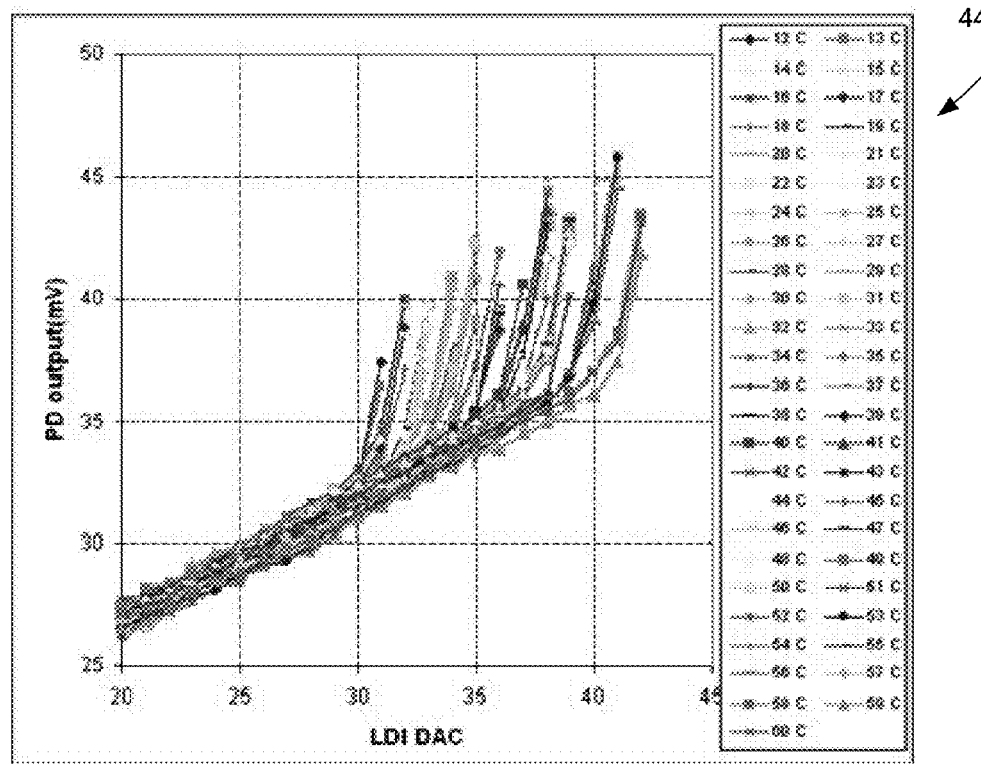

FIGS. 5 and 6 illustrate graphical representations 340 and 440 illustrating threshold laser diode power output relative to temperature using a photodetector. As illustrated in both FIGS. 5 and 6, the threshold laser power output has a linear relationship with respect to the change in environmental temperature in the data storage device or drive. In graph 340, as temperature increases so does the threshold laser power output. In graph 440, at higher temperatures, threshold laser power output is greater and therefore so is laser diode current. At lower temperatures, threshold laser power output is lower and therefore laser diode current can be lower.

Figure 7:
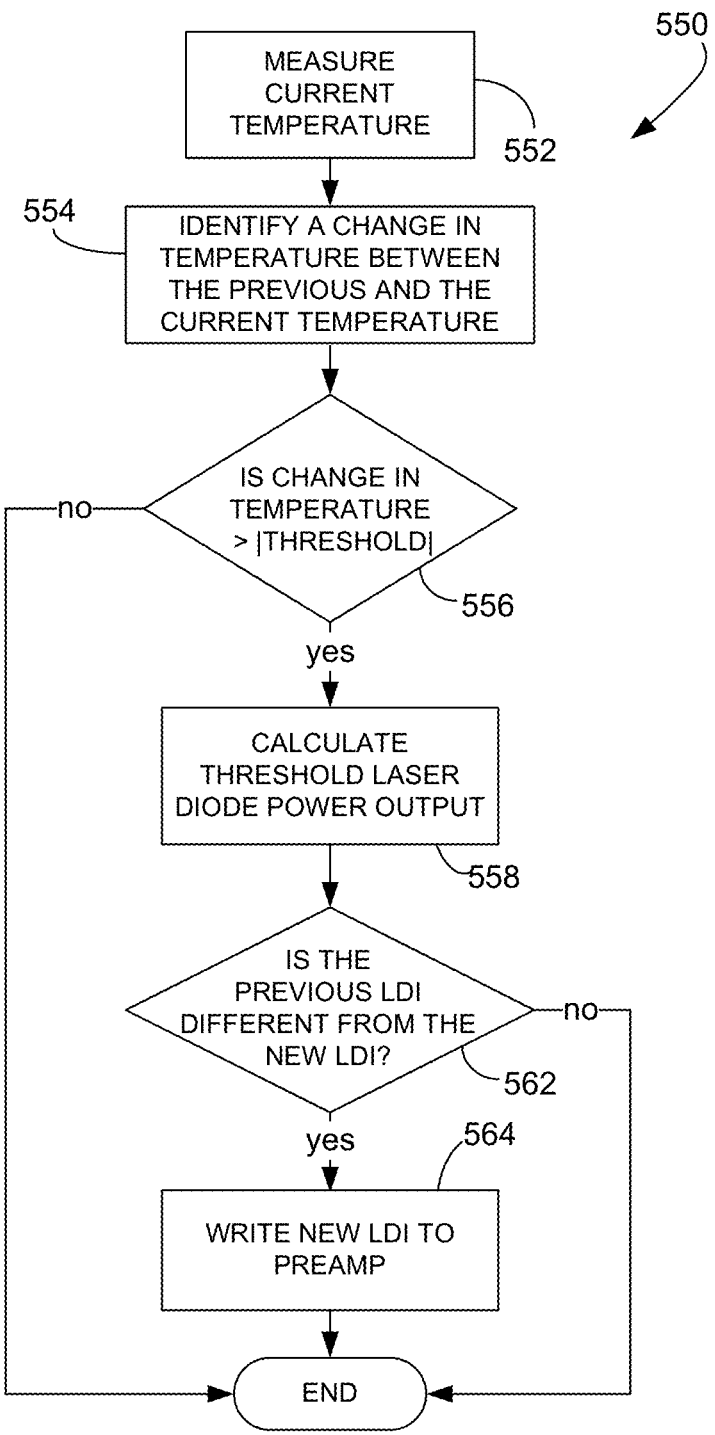
FIG. 7 is a block diagram illustrating a method of calibrating laser diode current in a HAMR device during preheating of the laser according to one embodiment.

FIG. 7 is a block diagram 550 illustrating a method of calibrating (or setting) laser diode current in a HAMR device, such as device 118, while the laser diode in laser assembly 126 is preheating according to one embodiment. In other words, the method illustrated in block diagram 550 is performed when data storage device 100 is idle (i.e., when the transducer is not processing commands) and by control circuitry 102.

Figure 8A:
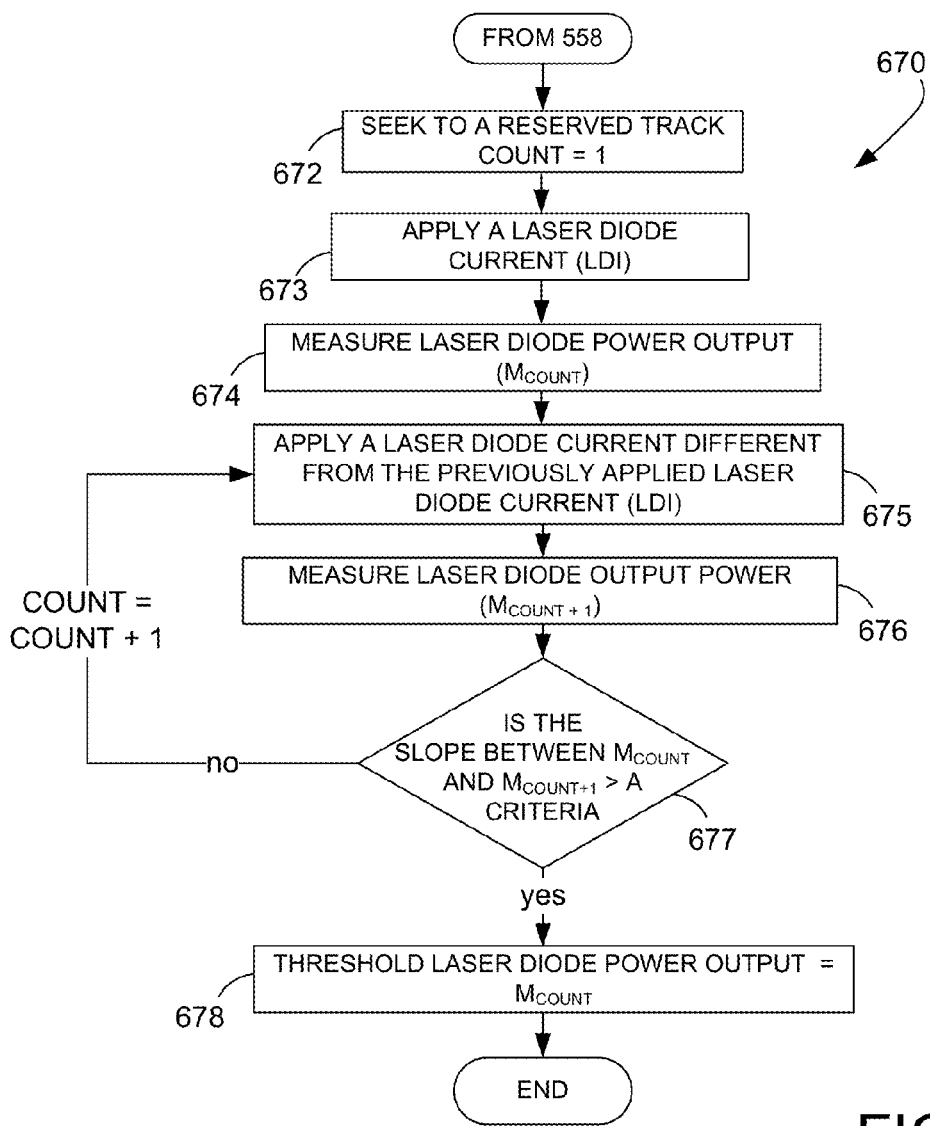
FIG. 8A is a block diagram illustrating a method of calculating a threshold laser power output according to one embodiment.
Figure 8B:
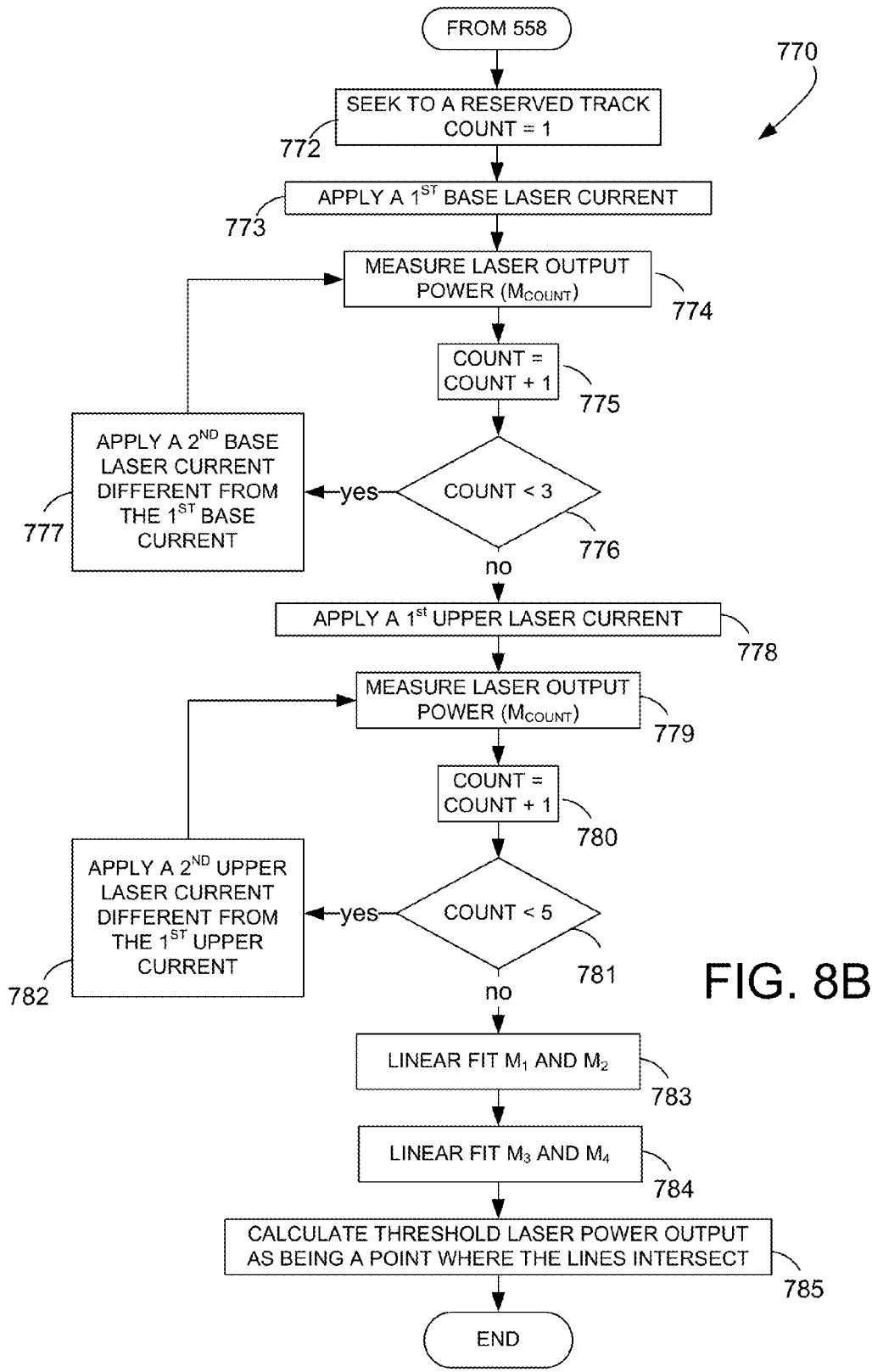
FIG. 8B is a block diagram illustrating a method of calculating a threshold laser power output according to another embodiment.

At block 552, a current temperature is measured. At block 554, the change in temperature between the previous temperature and the current temperature is determined. At block 556, it is determined whether there is a change in temperature between the previous and the current temperature. More specifically, it is determined whether this change in temperature is greater than a threshold value. One exemplary threshold value is 5 degrees. If the change in temperature is greater than the threshold value, then the method passes to block 558 and threshold laser diode power output is calculated at the current temperature. If the change in temperature is less than the threshold value, then the method passes to the end. FIGS. 8A and 8B illustrate two embodiments of this calculation.

FIG. 8A is a block diagram 670 illustrating a method of calculating threshold laser diode power output at the current temperature according to one embodiment. At block 672, HGA 120 seeks to a reserved track on medium 108. A laser diode current is applied at block 673 and at block 674 laser power output ($M_{COUNT}$ or $M_1$) is measured at the applied laser diode current using, for example, photodetector 127. A new laser diode current that is different from the previously applied laser diode current is applied at block 675 and at block 676 laser power output ($M_{COUNT+1}$ or $M_2$) is measured at the new laser diode current using, for example, photodetector 127.

At block 677, it is determined whether the slope between $M_1$ and $M_2$ is greater than a criteria. If it is, the method passes to block 678 and $M_1$ is calculated to be the threshold laser power output. If not, the method passes back to block 674, the count is increased by one and a new laser diode current is applied that is different from the previous laser diode current. At block $M_{COUNT}$ or $M_2$ to $M_{COUNT+1}$ or $M_3$. This method continues to loop until the slope between two laser diode power outputs with respect to laser diode current is greater than a criteria. When the slope is greater than the criteria, the method passes to 678 and $M_{COUNT}$ is calculated to be the threshold laser power output at the current temperature.

FIG. 8B is a block diagram 770 illustrating another method of determining a threshold laser diode power output at the current temperature according to another embodiment. The method illustrated in FIG. 8B is a four-point fitting method. While the method illustrated in FIG. 8A is more accurate, the method illustrated in FIG. 8B reduces the amount of time it takes to determine a threshold laser power output. Based on a generic profile of laser power output versus laser current with respect to temperature (such as the profile shown in the graphical representation illustrated in FIG. 6), a threshold laser diode power output can be estimated. Based on this estimation base level laser diode currents can be identified (i.e., laser diode currents where laser diode power output is below the estimated threshold laser diode power output) and upper level laser diode currents can be identified (i.e., laser diode currents where laser diode power output is above the estimated threshold laser diode power output).

At block 772, HGA 120 seeks to a reserved track on medium 108 and the count is set to one. A first base level laser diode current is applied at block 773 and at block 774 laser diode output power is measured ($M_{COUNT}$ or $M_1$) using, for example, photodetector 127. At block 775, the count is increased by one so that the count is now equal to two. At block 776, it is determined whether the count is less than three. Since the count is equal to two, the method passes to block 777 and a second base level laser diode current is applied that is different from the first base level laser diode current. The method returns to block 774 where laser diode power output is measured ($M_{COUNT}$ or $M_2$) using, for example, photodetector 127.

At block 775, the count is increased by one again so that the count is now equal to three. This time at block 776 it is determined that the count is not less than three, so the method passes to block 778 where a first upper level laser diode current is applied. At block 779, laser diode power output is measured ($M_{COUNT}$ or $M_3$) using, for example, photodetector 127. At block 780, the count is increased by one so that the count is equal to four and at block 781 it is determined whether the count is less than five. Since the count is equal to four, the method passes to block 782 and a second upper level laser diode current is applied that is different from the first upper level laser diode current. The method returns to block 779 where laser output power is measured ($M_{COUNT}$ or $M_4$) using, for example, photodetector 127.

Figure 9:
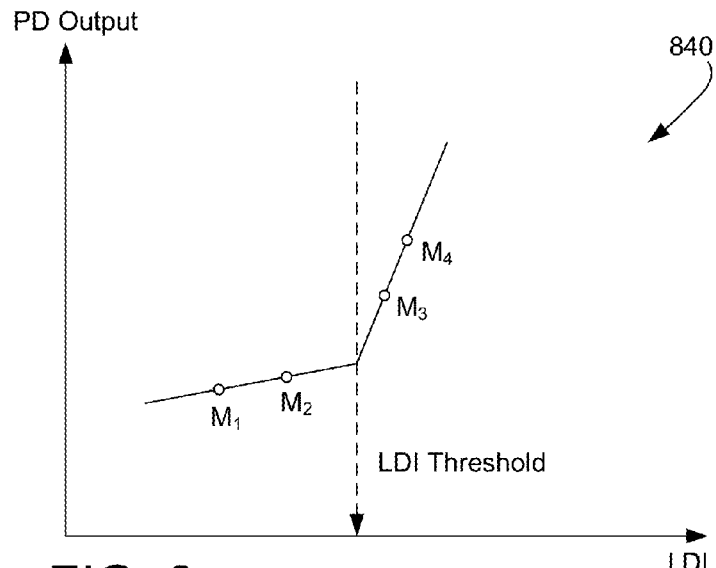
FIG. 9 a graphical representation of the method of FIG. 8B.

At block 780, the count is increased by one again so that the count is now equal to five. This time at block 776 it is determined that the count is not less than five, so the method passes to block 783. A block 783 and as illustrated in FIG. 9, a linear slope is fitted to $M_1$ and $M_2$. At block 784 and as illustrated in FIG. 9, a linear slope is fitted to $M_3$ and $M_4$. At block 785 and based on these two linear slopes, threshold laser diode power output is calculated. The calculated threshold laser diode power output is the point where the linear slopes intersect as is illustrated in FIG. 9. The point where the linear slopes intersect will also give the laser diode current where threshold laser power output occurs. This is labeled as LDI threshold in FIG. 9 and is the new laser diode current.

With reference back to FIG. 7, after threshold laser diode power output has been identified at block 558, which was calculated by the method illustrated in FIG. 8A or by the method illustrated in FIG. 8B, the method in FIG. 7 passes to block 562. At block 562, the laser diode current that preamp 107 is currently applying to the laser diode is compared to the new laser diode current that produces a threshold laser diode power output calculated in block 558. If the two values are different, then the method passes to block 564 and the new laser diode current is written to preamp 107. If there is no change between the two values, then the method passes to the end and no new laser diode current is written to preamp 107. In this way, the magnetic performance is compensated when a change in threshold laser diode power output is caused by a drive temperature change. This compensation is performed by adjusting the laser diode current set in preamp 107.

Figure 10:
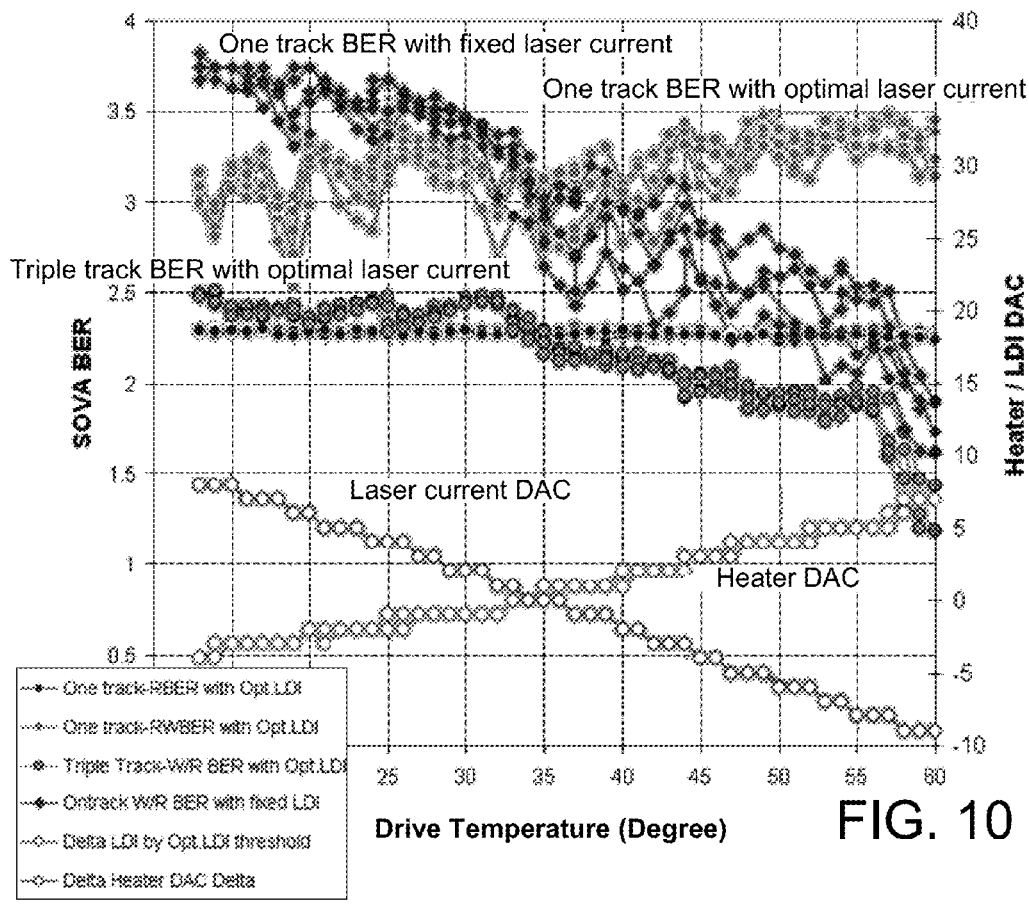
FIG. 10 is a graphical representation of bit error rate as a function of temperature to verify the effectiveness of the method illustrated in FIG. 7.

FIG. 10 is a graphical representation of bit error rate as a function of temperature to verify the effectiveness of the method illustrated in FIG. 7. In FIG. 10, both the one track and triple track bit error rate (BER) plot drops with a fixed laser diode current as temperature increases. The one track and the triple track BER plots, however, remain steady and relatively flat with optimized laser diode current being applied as temperature increases. Steady BER provides better magnetic performance.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   measuring a current temperature of a data storage device while in idle, wherein the data storage device includes a heat assisted magnetic recording (HAMR) device;
   calculating a threshold laser diode power output of the HAMR device at the current temperature when there is a change between a previous temperature and the current temperature;
   determining whether there is a change between the currently applied laser diode current and a new laser diode current that produced the calculated threshold laser diode power output; and
   applying the new laser diode current when there is a change in laser current from the currently applied laser diode current to the new laser diode current; and
   wherein calculating the threshold laser diode power output comprises seeking to a reserved track on a medium of the data storage device, applying a laser diode current, measuring laser diode power output, applying a laser diode current different from the previously applied laser current, measuring the laser diode power output, determining if a slope between the two measured laser diode power outputs are greater than a criteria and repeating the steps of applying a new laser diode current different from the previously applied laser current, measuring the laser diode power output and determining a slope between the two measured laser diode power outputs until the slope is greater than the criteria.

2. The method of claim 1, wherein the change between the previous temperature and the current temperature must be greater than a threshold value.

3. The method of claim 2, wherein the threshold value is 5 degrees.

4. The method of claim 1, wherein applying the new laser current comprises writing the new laser current to a preamp.

5. The method of claim 1, wherein when the slope is greater than the criteria then the threshold laser diode power output is the measured laser diode power output and the new laser diode current that produced the calculated threshold laser diode power output is the previously applied laser diode current.

6. The method of claim 1, further comprising determining an estimated threshold laser diode power output from a generic profile of laser power output versus laser current with respect to temperature.

7. The method of claim 6, further comprising identifying base level currents where laser diode power output is below the estimated threshold laser diode power output and identifying upper level laser diode currents where laser diode power output is above the estimated threshold laser diode power output.

8. A data storage device comprising:
   a medium;
   a heat assisted magnetic recording (HARM) device including a laser diode for heating the medium while writing data; and
   control circuitry configured to:
   measure a current temperature of the data storage device while in idle;
   calculate a threshold laser diode power output of the HAMR device at the current temperature when there is a change between a previous temperature and the current temperature;
   determine whether there is a change between the currently applied laser diode current and a new laser diode current that produced the calculated threshold laser diode power output; and
   write the new laser diode current to a preamp when there is a change in laser current from the currently applied laser diode current to the new laser diode current;
   wherein when the control circuitry calculates the threshold laser diode power output the control circuitry is configured to seek the HAMR device to a reserved track on a medium of the data storage device, apply a laser diode current, measure laser diode power output, apply a laser diode current different from the previously applied laser current, measure the laser diode power output, determine if a slope between the two measured laser diode power outputs are greater than a criteria, and repeat the steps of applying a new laser diode current different from the previously applied laser current, measuring the laser diode power output and determining a slope between the two measured laser diode power outputs until the slope is greater than the criteria.

9. The data storage device of claim 8, wherein the change between the previous temperature and the current temperature must be greater than a threshold value.

10. The data storage device of claim 8, wherein when the control circuitry applies the new laser current the control circuitry writes the new laser current to a preamp.

11. The data storage device of claim 8, wherein when the slope is greater than the criteria then the threshold laser diode power output is the measured laser diode power output and the new laser diode current that produced the calculated threshold laser diode power output is the previously applied laser diode current.

12. A method comprising:
   measuring a current temperature of a data storage device while in idle, wherein the data storage device includes a heat assisted magnetic recording (HAMR) device;
   calculating a threshold laser diode power output of the HAMR device at the current temperature when there is a change between a previous temperature and the current temperature that is greater than a threshold value;
   determining whether there is a change between the currently applied laser diode current and a new laser diode current that produced the calculated threshold laser diode power output; and
   writing the new laser diode current to a preamp when there is a change in laser current from the currently applied laser diode current to the new laser diode current; and
   wherein calculating the threshold laser diode power output comprises seeking to a reserved track on a medium of the data storage device, applying a first base level laser diode current, measuring a first laser diode power output, applying a second base level laser diode current different from the first base level laser diode current, measuring a second laser diode power output, applying a first upper level laser diode current, measuring a third laser diode power output, applying a second upper level laser diode current, measuring a fourth laser diode power output, linear fitting a first line to the first laser diode power output measurement and the second laser diode power output measurement and linear fitting a second line to the third laser diode power output measurement and the fourth laser diode power output measurement, and wherein a point where the first line intersects with the second line comprises the calculated threshold laser power output.

13. The data storage device of claim 12, wherein the first base level laser diode current and the second base level laser diode current are laser diode currents where laser diode power output is produced below an estimated laser diode power output.

14. The data storage device of claim 13, wherein the first upper level laser diode current and the second upper level laser diode current are laser diode currents where laser diode power output is produced above an estimated laser diode power output.

* * * * *